July 17, 1962 D. L. JAFFE ET AL 3,045,181

SPECTRUM TAPE RECORDER

Filed Sept. 21, 1959 2 Sheets-Sheet 1

INVENTORS
DAVID L. JAFFE
ALAN ROSS
BY *Darby & Darby*
ATTORNEYS

July 17, 1962 D. L. JAFFE ET AL 3,045,181

SPECTRUM TAPE RECORDER

Filed Sept. 21, 1959 2 Sheets-Sheet 2

INVENTORS
DAVID L. JAFFE
ALAN ROSS
BY Darby & Darby 3,045,181
SPECTRUM TAPE RECORDER David Lawrence Jaffe, Great Neck, and Alan Ross, Bayside, N.Y., assignors to Polarad Electronics Corporation, Long Island City, N.Y., a corporation of New York
Filed Sept. 21, 1959, Ser. No. 841,347
14 Claims. (Cl. 324—77)

This invention comprises means in combination with a spectrum analyzer for recording and playing back frequency spectra, in combination with means for recording and playing back speech normally in the form of monitoring observations.

The subject matter of this invention is capable of use in conjunction with various forms of commercially available spectrum analyzers, including those of the panoramic type.

Other and more detailed objects of the invention will be apparent from the following description of the embodiment thereof illustrated in the attached drawings and described below.

Figure 1:
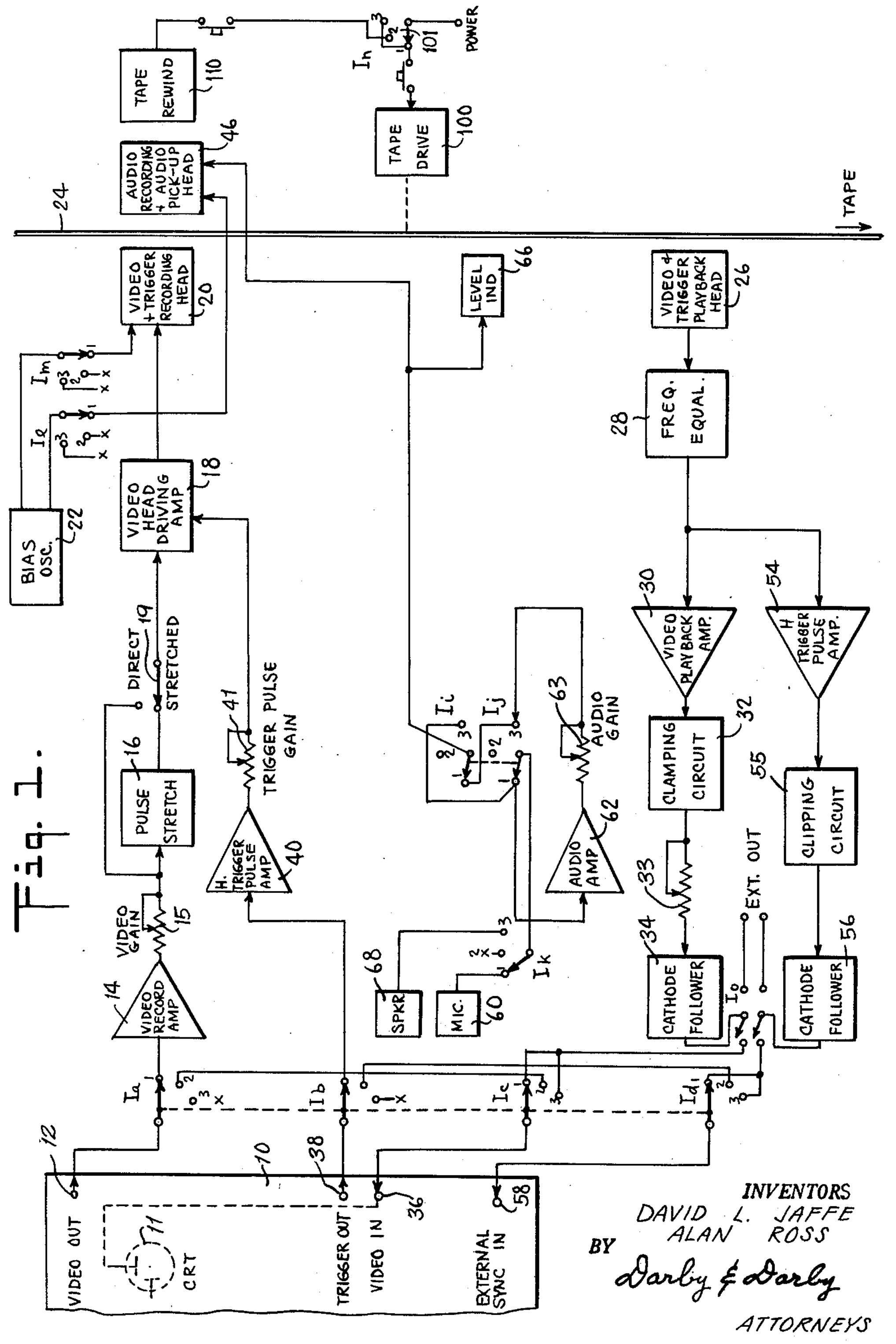
Figure 2:
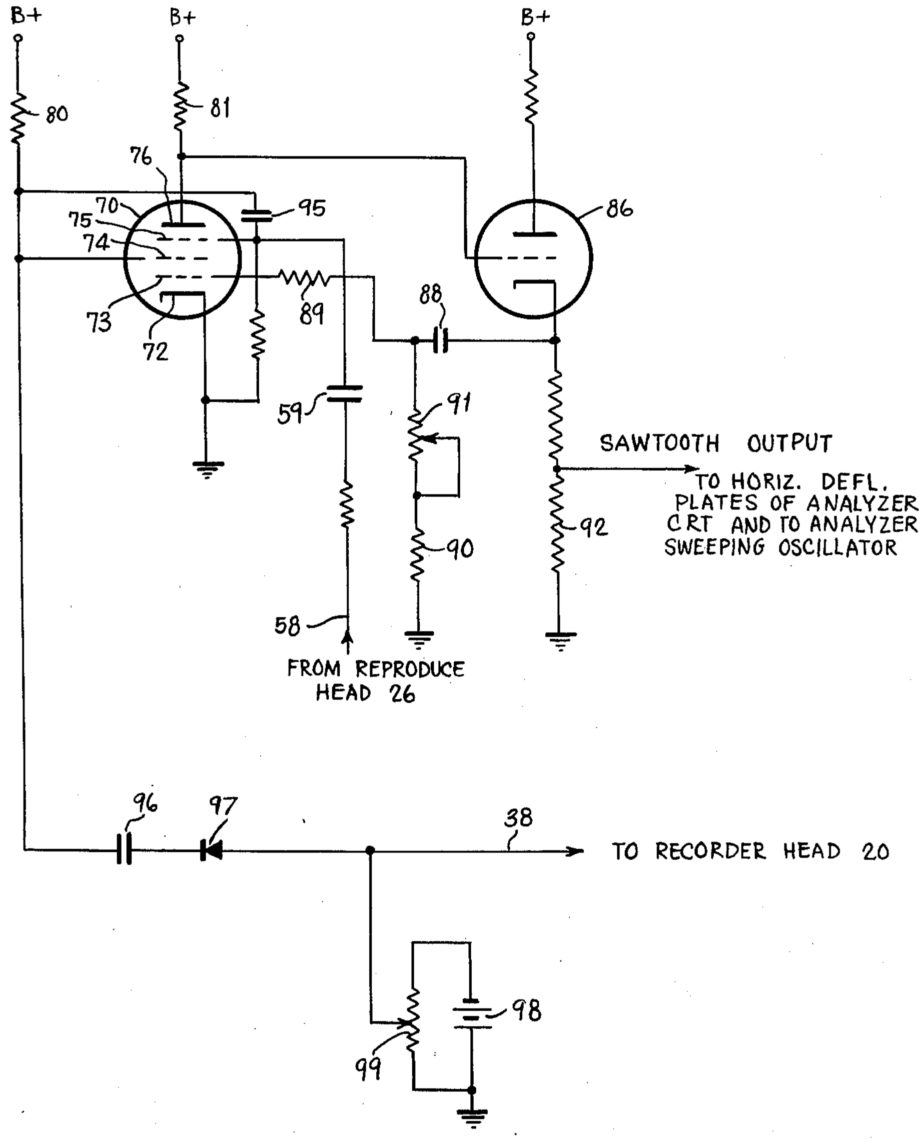

In the drawings, FIGURE 1 is a diagrammatic illustration of the recording and reproducing apparatus combination by means of which the various objects of this invention are accomplished; and FIGURE 2 is a schematic representation of a portion of a spectrum analyzer for use with the present invention.

Spectrum analyzers are commercially available from a number of sources and vary widely in their specific details of construction and operation. A specific example of such a device is now being manufactured and sold by Polarad Electronics Corporation as their Model TSA, which is an all band direct reading analyzer of the panoramic type. Such an instrument can analyze frequency spectra information of radio frequency signals. In the combination disclosed means are provided for recording the video information of an amplitude frequency spectrum and also for recording speech, as for example the operator's comments with respect to the spectrum being simultaneously recorded, with the result that complete data may be provided in permanent record form on a particular experiment or measurement. Specifically, the record is, for example, but not necessarily limited thereto, made on a magnetic tape.

In accordance with the invention the record is made on a storage medium on two tracks, one track having a record of the video information of the spectrum and the horizontal deflection trigger signals and the other track having an audio signal of the operator's comments. On playback the recorded video signals are reproduced to drive the vertical deflection plates of a cathode ray tube and the synchronizing signals are used to trigger the sweep circuit which controls the horizontal deflection of the electron beam of the cathode ray tube thereby reproducing the recorded spectrum.

For recording spectra of very narrow pulses with a wideband spectrum analysis of the type referred to, band width reduction is achieved by pulse width stretching. For flexibility provision is made for recording directly or through a pulse stretcher.

These various functions will be apparent to those skilled in the art by reference to FIGURE 1 of the accompanying drawing.

At 10 there has been shown diagrammatically a portion of a spectrum analyzer having a video signal output terminal 12, a video signal input terminal 36, a sync signal output terminal 38, and a sync signal input terminal 58. The spectrum analyzer 10 may be any of those types which are well known in the art used for forming an amplitude-frequency, or power, spectrum of an incoming signal in which the amplitudes of the frequency components forming the spectrum are displayed as a function of frequency. Such analyzers include, for example, a panoramic type of analyzer. Briefly described, a panoramic type of spectrum analyzer is one in which the incoming signal being analyzed is heterodyned with the signal produced by an oscillator which linearly sweeps in frequency over a range of frequency. In this manner, due to the heterodyning, each frequency component of the spectrum of the signal being analyzed is successively resolved into a signal of a common intermediate frequency. This intermediate frequency signal is amplified to form the video signal and the video signal, after amplification by suitable video amplifiers, is used to control the vertical deflection plates of a cathode ray display device. It is this video signal which is present at terminal 12.

The oscillator is made to linearly sweep in frequency by means of a sawtooth voltage which is used to vary the frequency of the output signal produced by the oscillator. The sawtooth voltage controls an element in the frequency determining circuit of the oscillator. For example, the element may be a reactance tube whose reactance varies as a function of applied voltage. As the reactance of the tube changes linearly, in accordance with the applied linear sawtooth voltage, the output frequency of the oscillator also changes linearly.

The sawtooth voltage which controls the output frequency of the oscillator, is also used to supply the deflection signals to the horizontal deflection plates of the cathode ray display device 11. Therefore, the variable frequency oscillator and the electron beam of the cathode ray display device both sweep in synchronism. Since the frequency components of the spectrum of the incoming signal are resolved in accordance with the signal produced by the sweeping oscillator, they are therefore displayed in the proper time sequence on the face of the display device from low to high frequency.

Referring to FIGURE 2, a circuit is shown for producing the sawtooth wave used to control the sweeping oscillator and the horizontal deflection plates of the cathode ray tube 11 of the analyzer. This circuit is the conventional phantastron circuit which products, in response to an internally generated trigger signal, a linear sawtooth sweep during one portion of its operating cycle and also produces a large magnitude spike pulse at its screen grid at the end of the sawtooth wave which effectively triggers off the next cycle of sawtooth waveform generation. The phantastron circuit is free running and does not need an externally supplied trigger pulse to initiate each sawtooth wave. However, it may be synchronized by a signal from an external source.

The operation of the phantastron circuit of FIG. 2 is well known and is described in many texts. Briefly considered, a pentode tube 70 is provided which has a cathode 72, control grid 73, screen grid 74, suppressor grid 75 and plate 76. The screen grid 74 and plate 76 are connected to a suitable source of B+ potential through the respective resistors 80 and 81, with the value of resistor 81 being higher than the value of resistor 80. The tube 70 may be considered as a tube within a tube, with the cathode 72, suppressor grid 75 and plate 76 forming the "first" tube and the cathode 72, control grid 73 and screen grid 74 forming the "second" tube.

Considering the pre-trigger condition of the phantastron, the voltages applied to the electrodes are such that the "first" tube is cut off and the "second" tube is conducting. This puts the plate 76 at a potential near B+, since no current is flowing thereto, and the screen grid 74 at a substantially lower voltage, due to the current received by it which flow through the resistor 80. Due to the arrangement of the circuit, any voltage change which causes plate current to flow in the triode which is cut off (first tube) starts a regenerative switching action. This voltage change can be applied to any of the electrodes of the tube, providing that it is of the proper magnitude and polarity. For the purposes of this description consider that a large magnitude negative pulse is applied to the screen grid 74. It should be noted that a negative pulse applied to the control grid 73 also initiates the switching action. The negative pulse applied to the screen grid 74 diverts the electrons from the screen grid 74 to the plate 76. This starts to drive the "second" tube toward cutoff and consequently the plate 76 starts to draw current causing a drop in plate voltage. The plate 76 is connected to the control grid 73 through a conventional cathode follower 86, the cathode of the tube 86, which "follows" the grid, is connected back to the control grid 73 of the phantastron 70 through a capacitor 88 and a resistor 89.

As the plate voltage of tube 70 drops, the drop is present at the cathode of the cathode follower 86. The capacitor 88 must discharge to this new lower voltage. This discharge is through a fixed resistor 90 and a variable resistor 91. In discharging, the end of the capacitor connected to control grid 73 goes positive. This increases the plate current of the tube 70 and starts another drop in plate voltage. The suppressor grid 75 is not involved in this action since it is a straight triode action between the cathode 72, the grid 73 and the plate 76. The consequent drop in plate voltage is opposite in effect to that of the discharging capacitor 88 and therefore the net result on the capacitor 88 is degenerative.

As the capacitor 88 discharges, the grid 73 goes positive and the plate current increases, decreasing the voltage at plate 76. This decrease in plate voltage is coupled back through the tube 86 to make the gird 73 go negative. The plate voltage cannot drop enough to exceed the positive voltage change at the grid 73 since it is the voltage change at grid 73 which causes the plate voltage to drop. Therefore, the plate voltage change counteracts only part of the effect of the capacitor 88 discharge, effectively slowing the discharge of the capacitor 88. The charge and discharge of the capacitor 88 controls the plate current of tube 70 accordingly and a sawtooth waveform is produced across the cathode load resistor 93 of cathode follower 86. The sawtooth waveform produced across resistor 93 is then applied to the sweeping oscillator and the horizontal deflection plates of the analyzer 10 during the cathode ray tube trace period. This sawtooth waveform is very linear since it is produced as a result of an exponential discharge of capacitor 88 at the grid 73 which is counterbalanced by a waveform of opposite curvature from the signal produced at the plate 76. The rate of charge and discharge of the capacitor 88 is controlled by the potentiometer 91. Potentiometer 91 serves as a sweep speed control.

During the production of the sawtooth wave, the plate 76 draws most of the current but the screen grid 74 was still drawing some current. As the plate voltage continues to fall, a point is reached where more electrons from the cathode 72 are collected by the screen grid 74 than are collected by the plate 76. This can occur even when the screen grid voltage is slightly less than the plate voltage because the screen grid is closer to the cathode than the plate. When the screen grid 74 takes more current than the plate, the plate current levels off and the plate voltage stops dropping. This levelling off initiates a switchover to the pre-trigger condition. When the voltage at the plate 76 stops dropping there is no counterbalancing voltage applied to the capacitor 88 and therefore it discharges at a rapid rate, driving grid 73 more positive and increasing the current flow to the screen grid 74, thereby dropping the screen grid voltage. This drop in screen grid voltage is coupled to the suppressor grid 75 through a capacitor 95 thereby forcing more electrons to go to the screen grid 74. This continues until substantially all of the electrons are collected by the screen grid 74 and the first tube is in its pre-trigger condition of plate current cutoff. At this point, the plate voltage is substantially equal to the B+ voltage.

When the current switches its flow from the plate 76 to the screen grid 74, a large negative pulse is produced at the screen grid, because the increase in current at the screen grid is very large. During the time of the production of this large negative voltage at the screen grid 74, the voltage at the cathode of tube 86 is going in the opposite polarity from the voltage of the sawtooth trace. This voltage acts on the horizontal deflection plates to make the electron beam retrace rapidly. During the retrace, no video signal is produced because the sweeping oscillator is also being returned to its original condition.

According to the preferred embodiment of the present invention, the large magnitude negative going pulse which is produced at the screen grid 74 during the retrace time is recorded, and at playback is used as an external synchronization signal to trigger the phantastron sweep circuit, or other type of triggered sweep circuit, in the analyzer 10. In the phantastron circuit, the magnitude of the negative pulse at the screen grid is many times greater than the magnitude of the video signal; and since it occurs during the retrace period, when no video signal is being produced, it does not interact with the video signal which is to be recorded. Before recording, the negative pulse is passed through a capacitor 96 to a clipping circuit formed by a diode 97 which is biased by means of a battery 98 and a voltage divider 99. The clipping circuit is set so as to pass only the large magnitude negative going pulse and in many applications it may be omitted, if desired, since the magnitude of the negative pulse is much greater than any of the other signals, such as noise.

Terminal 12 at which the analyzer video signal appears, is connected through a switch I*a* to the input of the video recording amplifier 14, whose output in turn is connectible through a video gain control 15 either to the input of a pulse stretcher 16 or to the input of a video signal recording head driving amplifier 18. This alternative connection is provided by means of a single pole double throw switch 19, as shown. The output of the amplifier 18 is fed to a recording head 20 by means of which the signal from the amplifier 18 is recorded on one track of a magnetic tape 24.

Terminal 38, at which the trigger pulse produced at the screen grid of the phantastron appears, is connected through a switch I*b* to the input of an amplifier 40 which amplifies the pulse which is, upon reproduction, used as an external synchronizing pulse to trigger the analyzer horizontal sweep circuit. The output of the trigger amplifier 40 is also applied to the recording head driving amplifier 18, so that both the video and the trigger pulses are recorded on the tape 24 by the recording head 20. As previously pointed out, the trigger pulses are produced during a period when there is no video signal. A trigger pulse gain control 41 is provided to control the gain of amplifier 40.

An audio signal for a second recording head 46 is supplied from a microphone 60 through the switch I*k* to a double-pole, double-throw switch, I*i*, I*j*, which switch in the position shown, passes the signal to the input of an audio amplifier 62 which has a gain control 63. The output signal from the amplifier 62 is used to drive the recording head 46 which records these signals on the tape 24. The recorded audio signals may be the observations of the anlyzer operator which are made as he observes the spectrum of the analyzed signal. These signals are placed on a separate track on the tape 24. In addition, the audio signal goes to a signal level indicator 66, which monitors the level of the audio recording.

For the sake of completeness it is noted that the drive for the tape 24 is diagrammatically illustrated at 100, which may be energized from a suitable power source through a switch 101 when it is switch position "1" or "3". Likewise the rewind mechanism 110 for the tape is similarly shown and similarly energized when switch 101 is in position "2".

It is preferable that the recording heads 20 and 46, which provide separate record tracks on the tape 24, have a minimum displacement transverse to the direction of tape travel and general conditions permitting they may be stacked next to each other as diagrammatically illustrated in FIGURE 1. In this manner two tracks are recorded on the tape 24. The first track contains the video information for the spectrum and the trigger pulses used to synchronize the analyzer sweep circuits on playback and the second track has the observations of the operator of the analyzer who is monitoring its operation.

At 22 is a biasing oscillator whose output can be delivered through the switches I*e* and I*m* to the video recording head 20 and the audio recording head 46 for the usual purpose for which such oscillators would be used under these circumstances.

For playback operation a pickup head 26 is provided for picking up the information recorded on the video and trigger signal track. The output signal of the pickup head 26 is applied to a frequency equalization circuit 28, which is used to compensate for any high or low frequency loss or distortion of the video signal which may occur during recording or playback. This circuit may be formed of suitable components as is well known in the art.

The output of the equalizing circuit is applied to the input of a video playback amplifier 30. Since the signal applied to the amplifier 30 contains both the video information and the trigger pulses, both of these components are amplified. If desired, a clipping circuit may be provided preceding the amplifier 30, to clip the trigger pulses from the video signal. However, since the cathode ray tube is usually provided with a blanking signal which is effective to shut off the cathode ray beam during the period of the beam retrace, which is also the period during which the trigger pulse appears, the clipping circuit is not essential. The output of the amplifier 30 is applied to a clamping circuit 32, which clamps the signal to a level suitable to operate the video amplifiers of the analyzer 10. The clamping level is set by the potentiometer 33. The output of the clamping circuit 32 is applied to a cathode follower 34, which serves to match the impedance of the playback channel to the low input impedance of the analyzer 10. The output signal from the cathode follower 34 is applied to the video input terminal 36 through switches I*o* and I*c*. The signal at terminal 36 is used to drive the vertical deflection plates of the cathode ray tube 11 and in this manner, the video signal recorded on the tape is visually reproduced.

The output of the equalizing circuits 28 is also applied to a trigger pulse amplifier 54. The amplified output signal is then passed to the input of a clipping circuit 55 which is set to pass only the trigger pulses and to clip off the video portion of the signal. Since the trigger pulse is many times greater in magnitude than the video signal, the separation of the trigger pulse is relatively simple. If desired, the clipping circuit 55 may be placed before the amplifier 54 so that the video signal is eliminated before amplification. The output of the clipping circuit is supplied to the input of a cathode follower 56 and the output of the cathode follower is, in turn, connected to terminal 58 through switches I*o* and I*d*. The trigger pulses at terminal 58 are applied through a capacitor 59 (FIG. 2) to synchronize the frequency of the phantastron sweep circuit. In this manner, the trigger pulses recorded on the tape 24 are used to synchronize the horizontal sweep circuit of the cathode ray tube 11, thereby keeping the video signal reproduced from the tape 24 and displayed on the cathode ray tube 11 in correct time relationship with the sweep. The switch I*o* may be set so that the video and trigger signals can be used to operate another display device, for example, an oscillograph with a triggered sweep circuit which is to be synchronized by signals from an external source.

During playback, the audio signals recorded on the tape 24 are picked up by the head 46, which serves the dual function of a recording and pickup head. The signal picked up by head 46 is passed through switch I*i* to the input of the amplifier 62 which has a potentiometer 63 to control its gain. The output of amplifier 62 is connected through switch I*d* to a speaker 28, which reproduces the recorded monitoring observations in the same relationship as they originally had to the recorded video signal. In this manner the spectrum of the signal formed by the analyzer is reproduced along with any monitoring observations made while the spectrum's video information was being recorded.

As clearly indicated in FIGURE 1, many of the switches are three position switches which positions are indicated by the numbers 1, 2 and 3. All of these three position switches are mechanically "ganged" together as shown by the dotted lines so the various functions of the system may be controlled by one switch. The "1" position sets up circuits for recording and monitoring, the "2" position of the switches is the off position for the recording and monitoring part of the circuit, completing circuits, however, as will be explained to leave the analyzer 10 in its normal operative condition. The "3" position of these switches is the playback position. The switches are all shown in the "1" position, that is, the recording and monitoring position.

If we assume that the analyzer 10 has been set in operation and adjusted for particular experiment it will be seen that the video amplifier 14 output signal is passed to the recording head 20 and recorded in one track on the tape 24, either with or without pulse stretching (as determined by the position of switch 19) and with or without bias (as determined by the position of switch I*m*). On playback, when the video track reaches the video playback head 26, a signal is passed back to the terminal 36, with the result that the vertical plates of the cathode ray tube are supplied deflection voltages in accordance with the signal at terminal 36. Similarly, circuits are completed to pass the trigger pulses picked up by head 26 back to the terminal 58, from which they are used to synchronize the horizontal sweep circuit of the display device. Also, the recorded observations are reproduced by the speaker 68 so that the monitoring information is heard at the same time that the recorded video information is displayed.

The net results of these operations is that as the operator views the cathode ray tube and inspects the spectrum displayed thereon he can substantially simultaneously record comments comprising his observations with respect thereto, at the same time as the video information is being recorded. A permanent tape record of the signals representative of the spectrum being produced and of the comments is therefore made available for any future desired use.

When all of the switches are in the number "2" position the recording and playback apparatus is taken out of the circuit with the analyzer 10 and the video and sweep circuits are completed internal of the analyzer 10 in their normal manner. Under these conditions terminal 12 is connected through the switches I*a* and I*c* to terminal 36, thereby completing the video circuit. Similarly terminal 38 is connected through the switches I*b* and I*d* to the terminal 58.

In order to convert the records on the tape track to visible and audible manifestations the various switches are placed in the number "3" position. In this case terminals 12 and 38 are disconnected from the circuit. The signal of the video track is picked up by the head 26 and is passed back through switch I*o* and I*c* to the terminal 36. Similarly the trigger pulses picked up by the head 26 are passed back through the switches I*o* and I*d* to the terminal 58 as an external synchronization signal for the analyzer horizontal sweep circuit.

With the switches in the "3" position the pickup head 46 picks up the audio signal on the record track and passes it back through the switch I*i* and from there to the input of the audio amplifier 62, and then back through switches I*j* and I*k* to the speaker 68.

While there is disclosed herein a magnetic tape on which the records are made, it will be apparent to those skilled in the art that there are many other forms of magnetic records such as a magnetizable drum, a disc, and a wire including also the non-magnetizable members having magnetizable coatings. For this reason it is intended in referring in the claims that the term "tape" include any suitable form of magnetic record member.

From the above description it will be seen that the spectra signals can be recorded continuously while being monitored to provide a permanent record and that record can later be used to reproduce the events which were recorded.

It will be understood that the various circuit combinations represented by the various block illustrations have many forms in the art and in view of the nature of the device those skilled in the art will readily appreciate the specific circuitry necessary to effect various functions such as amplification, pulse stretching, filtering, clipping, clamping and frequency equalization.

In view of the foregoing, in the light of the objectives of the invention, it will be apparent to those skilled in the art that the subject matter of this invention is capable of variation in its detail, and we do not, therefore, desire to be limited to the specific embodiment selected for purposes of explanation of the invention but only as required by the appended claims.

What is claimed is:

1. The combination including a spectrum analyzer, said spectrum analyzer having means for resolving an incoming signal into video signals which are representative of the amplitude-frequency spectrum of the incoming signal, means for displaying said video signals, said last named means including a deflection element, means for producing deflection signals to control said deflection element, said deflection signal producing means also producing trigger signals, a storage medium, and means for recording said video signals and said trigger signals on said storage medium.

2. The combination including a spectrum analyzer, said spectrum analyzer having means for resolving an incoming signal into video signals which are representative of the amplitude-frequency spectrum of the incoming signal, means for displaying said video signals, said last named means including a deflection element, means for producing deflection signals to control said deflection element, said deflection signal producing means also producing trigger signals, a storage medium, means for recording said video signals and said trigger signals on said storage medium, and means for recording audio monitoring signals on said storage medium simultaneously with the recording of said video signals.

3. The combination including a spectrum analyzer, said spectrum analyzer having a sweep generator for producing sawtooth waveforms and a trigger signal at the termination of each of said sawtooth waveforms, said sweep generator being triggered to produce a sawtooth waveform in response to a trigger signal, said spectrum analyzer also including means for resolving an incoming signal into video signals which are representative of the amplitude-frequency spectrum of said incoming signal during the periods that said sawtooth waveforms are produced, a storage medium, and means for recording on said storage medium said video signals and said trigger signals produced by said sweep generator.

4. The combination including a spectrum analyzer, said spectrum analyzer having a sweep generator for producing sawtooth waveforms and a trigger signal at the termination of each of said sawtooth waveforms, said sweep generator being triggered to produce a sawtooth waveform in response to a trigger signal, said spectrum analyzer also including means for resolving an incoming signal into video signals which are representative of the amplitude-frequency spectrum of said incoming signal during the periods that said sawtooth waveforms are produced, a storage medium, means for recording on said storage medium said video signals and said trigger signals produced by said sweep generator, and means for recording audio monitoring signals on said storage medium simultaneously with the recording of said video signals.

5. The combination including a spectrum analyzer, said spectrum analyzer having a phantastron sawtooth waveform generator, said phantastron having an electron discharge device including a plurality of electrodes and producing a sawtooth waveform at one of said electrodes and a trigger signal at another of said electrodes at the termination of said sawtooth waveform, said phantastron being synchronized to produce a sawtooth waveform in response to a trigger signal applied to one of its electrodes, said spectrum analyzer also including means for resolving an incoming signal into video signals which are representative of the amplitude-frequency spectrum of said incoming signal and means for displaying said video signals in time relation with said sawtooth waveform, a storage medium, and means for recording on said storage medium said video signals and the trigger signals produced by said phantastron.

6. The combination including a spectrum analyzer, said spectru manalyzer having a phantastron sawtooth waveform generator, said phantastron having an electron discharge device including a plurality of electrodes and producing a sawtooth waveform at one of said electrodes and a trigger signal at another of said electrodes at the termination of said sawtooth waveform, said phantastron being synchronized to produce a sawtooth waveform in response to a trigger signal applied to one of its electrodes, said spectrum analyzer also including means for resolving an incoming signal into video signals which are representative of the amplitude-frequency spectrum of said incoming signal and means for displaying said video signals in time relation with said sawtooth waveform, a storage medium, means for recording on said storage medium said video signals and the trigger signals produced by said phantastron, and means for recording audio monitoring signals on said storage medium simultaneously with the recording of said video signals.

7. The combination including a spectrum analyzer, said spectrum analyzer having a sweep generator for producing sawtooth waveforms and a trigger signal at the termination of each of said sawtooth waveforms, said sweep generator being synchronized to produce a sawtooth waveform in response to a trigger signal, said spectrum analyzer also including means for resolving an incoming signal into video signals which are representative of the amplitude-frequency spectrum of the incoming signal and means for displaying said video signals in time relation with and during the period that said sawtooth signals are produced, said display means being operative in response to said sawtooth waveforms, a storage medium, and means for recording said video signals and said trigger signals produced by said sweep generator.

8. The combination including a spectrum analyzer, said spectrum analyzer having means for resolving an incoming signal into video signals which are representative of the amplitude-frequency spectrum of the incoming signal, means for displaying said video signals, said last named means including a deflection element, means for producing deflection signals to control said deflection element, means for producing trigger signals, a storage medium, means for recording said video signals and said trigger signals on said storage medium, and means for reproducing the recorded video and trigger signals, means for applying said reproduced video signals to the display device of said spectrum analyzer for display thereon, means for applying said reproduced trigger signals to said spectrum analyzer deflection signal producing means to synchronize and trigger said last named means into producing a signal to control said deflection element of said display means.

9. The combination including a spectrum analyzer, said spectrum analyzer having means for resolving an incoming signal into video signals which are representative of the amplitude-frequency spectrum of the incoming signal, means for displaying said video signals, said last named means including a deflection element, means for producing deflection signals to control said deflection element, means for producing trigger signals, a storage medium, means for recording said video signals and said trigger signals on said storage medium, means for recording audio monitoring signals on said storage medium simultaneously with the recording of said video signals, means for reproducing the recording video and trigger signals, means for applying said reproduced video signals to the display device of said spectrum analyzer for display thereon, means for applying said reproduced trigger signals to said spectrum analyzer deflection signal producing means to synchronize and trigger said last named means into producing a signal to control said deflection element of said display means, and means for reproducing said recorded audio monitoring signals along with the display of the simultaneously recorded video signals.

10. The combination including a spectrum analyzer, said spectrum analyzer having a sweep generator for producing sawtooth waveforms and means for producing a trigger signal at the termination of each of said sawtooth waveforms, said sweep generator producing a sawtooth waveform in response to a trigger signal, said spectrum analyzer also including means for resolving an incoming signal into video signals which are representative of the amplitude-frequency spectrum of the incoming signal and means for displaying said video signals in time relation with and during the period that said sawtooth signals are produced, said display means being operative in response to said sawtooth waveforms, a storage medium, means for recording said video signals and said trigger signals, means for reproducing the recorded video and trigger signals, means for applying said reproduced video signal to the display means of the spectrum analyzer for display thereon, and means for applying said reproduced trigger signals to said sweep generator to synchronize and trigger it into producing sawtooth waveforms which operate said display means and cause the display of said reproduced video signals in time relation therewith.

11. The combination including a spectrum analyzer, said spectrum analyzer having a phantastron sawtooth waveform generator, said phantastron having an electron discharge device including a plurality of electrodes and producing a sawtooth waveform at one of said electrodes and a trigger signal at another of said electrodes at the termination of said sawtooth waveform, said phantastron producing a sawtooth waveform in response to a trigger signal applied to one of its electrodes, said spectrum analyzer also including means for resolving an incoming signal into video signals which are representative of the amplitude-frequency spectrum of said incoming signal and means for displaying said video signals in time relation with said sawtooth waveform, a storage medium, means for recording on said storage medium said video signals and the trigger signals produced by said phantastron, means for reproducing the recorded video and trigger signals, means for applying said reproduced video signal to the display means of the spectrum analyzer for display thereon, and means for applying said reproduced trigger signals to one of the electrodes of said phantastron to synchronize and trigger it into producing sawtooth waveforms which operate said display means and cause the display of said reproduced video signals in time relation therewith.

12. The combination including a spectrum analyzer, said spectrum analyzer having a phantastron sawtooth waveform generator, said phantastron having an electron discharge device including a plurality of electrodes and producing a sawtooth wave form at one of said electrodes and a trigger signal at another of said electrodes at the termination of said sawtooth waveform, said phantastron producing a sawtooth waveform in response to a trigger signal applied to one of its electrodes, said spectrum analyzer also including means for resolving an incoming signal into video signals which are representative of the amplitude-frequency spectrum of said incoming signal and means for displaying said video signals in time relation with said sawtooth waveform, a storage medium, means for recording on said storage medium said video signals and the trigger signals produced by said phantastron, means for recording audio monitoring signals on said storage medium simultaneously with the recording of said video signals, means for reproducing the recorded video and trigger signals, means for applying said reproduced video signal to the display means of the spectrum analyzer for display thereon, means for applying said reproduced trigger signals to one of the electrodes of said phantastron to snychronize and trigger it into producing sawtooth waveforms which operate said display means and cause the display of said reproduced video signals in time relation therewith, and means for reproducing said recorded audio monitoring signals along with the display of the simultaneously recorded video signals.

13. The combination including a spectrum analyzer, said spectrum analyzer having means for producing sawtooth sweep signals and large magnitude trigger signals at the end of each of said sawtooth signals, said last named means producing a sweep signal in response to a trigger signal, said spectrum analyzer also including means for resolving an incoming signal into video signals which are representative of the amplitude-frequency spectrum of said incoming signal and means for displaying said video signals in time relation with and during the period that said sawtooth signals are produced, said trigger signals being produced only during the intervals when no video signals are produced, a storage medium, first means for recording said video signals and said trigger signals produced by said sweep producing means, second recording means for recording audio monitoring signals on said storage medium simultaneously with the recording of said video signals, said first means also being used for reproducing the recorded trigger and video signals, means for separating said trigger signals from said video signals, means for applying said reproduced trigger signals to the sweep producing means to synchronize the production of the sawtooth signals, means for applying said reproduced video signals to the display means to energize said display means for producing a display of the recorded video signals, and means for reproducing the simultaneously recorded audio monitoring signals.

14. The combination including a spectrum analyzer, said spectrum analyzer having means for resolving an incoming signal into video signals which are representative of the amplitude-frequency spectrum of said incoming signal, means for producing trigger signals which are related to the operation of said resolving means, a storage medium, means for recording on said storage medium said video signals and said trigger signals, and means for recording audio monitoring signals on said storage medium.

References Cited in the file of this patent

UNITED STATES PATENTS

| | | |
|---|---|---|
| 2,378,383 | Arndt | June 19, 1945 |
| 2,476,445 | Lacy | July 19, 1949 |
| 2,530,693 | Green | Nov. 2, 1950 |
| 2,553,610 | Singleton | May 22, 1951 |
| 2,837,729 | Houghton et al. | June 3, 1958 |
| 2,958,822 | Rogers et al. | Nov. 1, 1960 |
| 2,964,704 | Shapiro et al. | Dec. 13, 1960 |
| 2,998,568 | Schlessel | Aug. 29, 1961 |

OTHER REFERENCES

"The Cathode Ray Sound Spectroscope," article in The Journal of the Acoustical Society of America, September, 1949.